United States Patent [19]

Clegg

[11] Patent Number: 4,589,743

[45] Date of Patent: May 20, 1986

[54] CIRCULAR MICROSCOPE SPECIMEN SLIDE

[76] Inventor: John E. Clegg, 2320 Keystone Dr., Orlando, Fla. 32806

[21] Appl. No.: 709,963

[22] Filed: Mar. 8, 1985

[51] Int. Cl.$^4$ .............................................. G02B 21/34
[52] U.S. Cl. ..................................... 350/536; 350/534
[58] Field of Search ............... 350/536, 534, 535, 532; 356/246, 244

[56] References Cited

U.S. PATENT DOCUMENTS 2,494,834  1/1950  Ringheim ............................. 350/516
4,115,011  9/1978  Brunsting ............................ 356/246

Primary Examiner—Jon W. Henry

[57] ABSTRACT

A circular specimen slide with five recessed viewing chambers arranged in a circle around a central viewing chamber. The slide has a straight edge which provides standard orientation of the slide and permits any recorded position of a specimen to be located and viewed again even after the slide has been removed from the microscope stage.

1 Claim, 3 Drawing Figures

CIRCULAR MICROSCOPE SPECIMEN SLIDE

BACKGROUND

Prior art includes a number of specimen slides with multiple recessed viewing chambers, such as U.S. Pat. No. 2,302,830 of Axelrod, U.S. Pat. No. 3,656,833 of Wallace, U.S. Pat. No. 4,022,521 of Hall et al, U.S. Pat. No. 4,387,972 of Valencia and U.S. Pat. No. 4,441,793 of Elkins.

These slides are rectangular with viewing chambers arranged in rows.

The features of the circular slide which are claimed as original and unique are as follows;
1. The slide is circular.
2. The slide has a straight edge.
3. There are five viewing chambers arranged in a circle around one central viewing chamber.

The circular slide is designed for use with the *Universal Revolving Microscopic Stage,* Ser. No. 685,007, filed 12/21/84, by this inventor. This stage has combined circular and linear movements which permit systematic search of the entire specimen area of each chamber and the recording of specific locations of a specimen which can be viewed again.

DRAWINGS

DESCRIPTION

Figure 1:
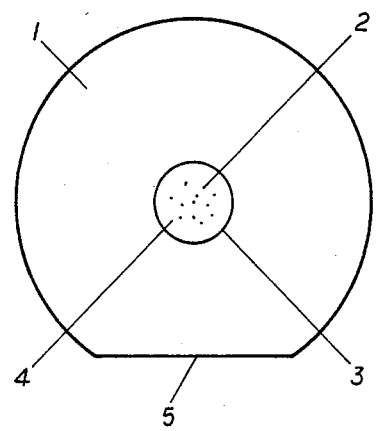
FIG. 1 is a plan view of a circular microscope specimen slide with a single central viewing chamber.

FIG. 1 is a plan view of a circular microscope specimen slide 1 with a crushed mineral specimen 2 embedded in Canada balsam in a central recessed viewing chamber 3 under coverslip 4 which fits inside viewing chamber 3.

The purpose of straight edge 5 is to provide standard orientation of the slide when placed in a slot of the same shape and dimensions in a universal revolving microscope stage.

Figure 2:
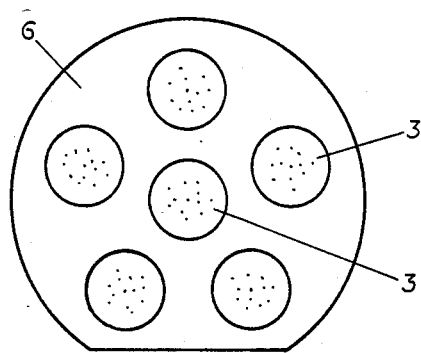
FIG. 2 is a plan view of a circular microscope specimen slide with five viewing chambers arranged in a circle around a central viewing chamber.

FIG. 2 shows a circular slide 6 with five recessed viewing chambers 3 arranged in a circle around one central viewing chamber 3. Viewing chambers 3 are circular with a planar base and a vertical cylindrical side wall.

Figure 3:
FIG. 3 is a cross section of a circular microscope specimen slide with three viewing chambers exposed to view.

FIG. 3 shows the viewing chambers 3 in cross section.

I claim:
1. A circular microscope specimen slide (6) defined by a circular edge and a straight edge (5) and having five recessed circular viewing chambers (3) arranged in a circle around one central recessed circular viewing chamber (3): said viewing chambers (3) having a planar base and a vertical cylindrical side wall.